United States Patent [19]

Aroshidze et al.

[11] 4,145,626
[45] Mar. 20, 1979

[54] ELASTIC MOUNTING OF A CORE IN AN ELECTRIC MACHINE STATOR

[76] Inventors: Jury V. Aroshidze, Moskovsky prospekt, 199, kv. 37; Vadim I. Iogansen, Gavanskaya ulitsa, 34, kv. 167; Ibragim A. Kadi-ogly, Tallinskoe shosse, 66, kv. 180; Jury V. Petrov, prospekt Kosmonavtov, 50, korpus 4, kv. 24; Izrail A. Ptakul, Pulkovskaya ulitsa, 17, kv. 158; Vasily V. Romanov, Naberezhnaya Chernoi Rechki, 18, kv. 30; Vasily L. Sudarikov, ulitsa Bela Kuna, 13, kv. 32; Vladimir P. Chernyavsky, Pulkovskaya ulitsa, 17, kv. 185; Aron B. Shapiro, Basseinaya ulitsa, 53, kv. 71; Gennady V. Shkoda, Bukharestskaya ulitsa, 39, korpus 3, kv. 38, all of Leningrad, U.S.S.R.

[21] Appl. No.: 768,289

[22] Filed: Feb. 14, 1977

[51] Int. Cl.² ............................................. H02K 5/00
[52] U.S. Cl. ........................................ 310/91; 310/51
[58] Field of Search ...................... 310/91, 89, 51, 254, 310/258, 259, 157

[56] References Cited

U.S. PATENT DOCUMENTS

| 2,320,843 | 6/1943 | Baudry | 310/51 UX |
|---|---|---|---|
| 2,554,226 | 5/1951 | Taylor | 310/51 UX |
| 2,561,994 | 7/1951 | Rashevsky | 310/51 UX |
| 3,708,707 | 1/1973 | Kranz | 310/258 |
| 4,012,654 | 3/1977 | Starcevic | 310/91 |

FOREIGN PATENT DOCUMENTS 1117651  6/1968  United Kingdom ..................... 310/51

OTHER PUBLICATIONS

Resilient Suspension for Stators of Single-Phase Synchronous Machines; Brown Boveri; vol. 61, No. 7; 7/74; pp. 346-353.

Primary Examiner—R. Skudy
Attorney, Agent, or Firm—Lackenbach, Lilling & Siegel

[57] ABSTRACT

A stator of an electric machine comprises a frame mounted on a base by means of supporting feet. A laminated core is supported in the frame with its laminations clamped together in the axial direction by support ribs located in slots in the frame. The support ribs are equally spaced around the periphery of the core said only the support ribs adjacent the maximum rigidity portions of the frame are attached thereto and made resilient. Such an arrangement of resilient links between the core and the frame tends to minimize the stator vibrations transmitted to the frame and the base. The support ribs not attached to the frame are provided for uniform compression of the core and may be rigidly secured to the surface thereof.

8 Claims, 6 Drawing Figures

ELASTIC MOUNTING OF A CORE IN AN ELECTRIC MACHINE STATOR

FIELD OF THE INVENTION

The present invention relates to the art of heavy electromechanical engineering and, more particularly, to stators of electric machines, such as high-power turbo alternators.

During operation of a large electric machine, the core of its stator is subject to distortion as a result of interaction with the magnetic field produced by the moving rotor. The cross-sectional distortion of the stator core will follow the rotation of the rotor, thus initiating, therewith, radial and tangential vibrations of the core. These vibrations are transmitted to the stator frame and the base and, thereby, give rise to an increased amount of acoustic noise and may result in fatigue damage of the members securing the core to the frame, or the frame itself, or the equipment and facilities mounted on the base adjacent to the electric machine. In order to minimize the transmission of the core vibration to the frame and the base, a means for flexibly supporting the core in the surrounding frame is provided.

DESCRIPTION OF THE PRIOR ART

Electric machine stator constructions are known in the prior art in which the core is supported in the frame by means of resilient members located on its ends. The disadvantages of this construction are the necessity of assembling the core within a special inner frame, considerable bending distortions of the core when it is too long, and purely constructional problems of designing small-size vibration absorbers meeting the requirements of both high strength and resilience.

In some prior art embodiments of the stator, the core is supported in the machine frame along two to four generating lines of the outer cylindrical surface of the core. In this case, the core is again assembled in an inner frame, to which resilient members are attached, generally in the form of flexible plates mounted tangentially to the core back and binding the inner frame with the stator frame of the turbo alternator. Such constructions are complicated by the presence of the inner frame. Rigid connection between the inner frame and the core is lost as a result of vibration, the amount of vibration and noise is increased, and there arises the additional problem of ensuring sufficient strength of the inner frame. In addition, the resilient plates protect the frame and the base of the electric machine only from the radial components of the core vibration.

There are further constructions of stators with a so called "multi-point" attachment of the core to the frame and the base, wherein a plurality of resilient members are spaced along the stator and around the periphery thereof. The resilient members are then secured to the support ribs of the core or formed as an integral part of the ribs and provide resilience in both radial and tangential directions,. Thus the support ribs equally spaced around the circumference of the core outer surface and secured thereto by a dovetail key and slot connection not only restrain the core in the axial direction, but act as supporting members to attach the core to the stator frame. Due to the frame having two base-mounted supporting feet, its rigidity will vary around the periphery of the frame. The rigidity of the frame is maximum in the area of the supporting feet. The disadvantage of securing the frame by means of support ribs, therefore, consists in that the frame is attached to the core all over the surface, i.e. at the points of both minimum and maximum amplitudes of the frame vibration. As the energy transmitted, during a cycle of vibration, through an individual resilient link is proportional to the input-output vibration amplitude product, in such constructions with flexibly support of the stator core, the vibration energy transmitted to the frame and the base may reach an excessive value.

Furthermore, in the aforementioned constructions, the support ribs carry a non-uniform static load due to the core weight and the torque. It is the side and lower ribs that carry the bulk of the load. The upper ribs are but slightly stressed, as the radial distortions caused therein by the core weight and increased core diameter, when compressed, are oppositely directed and tend to cancel out.

In operation, as a result of vibration, the contacting surfaces in the slots of the rib dovetails are worn out, the clearances are increased, and the upper ribs are completely relieved of stress. The unstressed upper ribs can have independent vibrations with high amplitudes and impacts against the slots, thus causing the noise in the machine to increase and resulting in damage to the supporting members of the stator core.

SUMMARY OF THE INVENTION

It is an object of the present invention to minimize vibrations of the electric machine stator frame.

Another object of the invention is to increase the reliability of the flexible support of the stator core in the electric machine frame.

These and other objects are attained by a stator of an electric machine comprising a frame mounted on a base by means of supporting feet and a laminated core supported in the frame with the laminations clamped together in the axial direction by support ribs equally spaced around the periphery of the core. In accordance with the invention, only the support ribs adjacent the most rigid portions of the frame are secured thereto and are made resilient.

The proposed construction of the stator ensures a reduced level of vibration and noise for the core is attached to the frame in locations where the frame is least responsive to vibrational excitation. The construction is made more reliable since the ribs secured to the frame are more uniformly stressed, and the possibility of stress-relieving individual ribs is eliminated.

According to one embodiment of the invention, the resilient support ribs attached to the frame are located in the area of the frame supporting feet, while the remaining support ribs are mounted on the remaining portion of the core outer surface.

Another embodiment of the invention consists in that the resilient support ribs attached to the frame are located in the area of the frame supporting feet and of the base, while the remaining support ribs are mounted on the remaining portion of the core outer surface.

It is also possible to provide, in the area of the frame supporting feet, additional resilient ribs secured to the frame and positioned in the slots on the outer surface of the core intermediate the resilient support ribs.

It is advisable that the support ribs adjacent the lower rigidity portions of the frame should be secured longitudinally along the surface of the core by means of additional interconnecting members.

The additional interconnecting members may be provided in the form of a U-shaped clamp resting against the core surface and bolted to the rib.

DESCRIPTION OF THE DRAWINGS

Other objects and advantages of the present invention will become apparent from the following detailed description of the embodiments taken in conjunction with the accompanying drawings, in which.

DETAILED DESCRIPTION OF THE INVENTION

Figure 1:
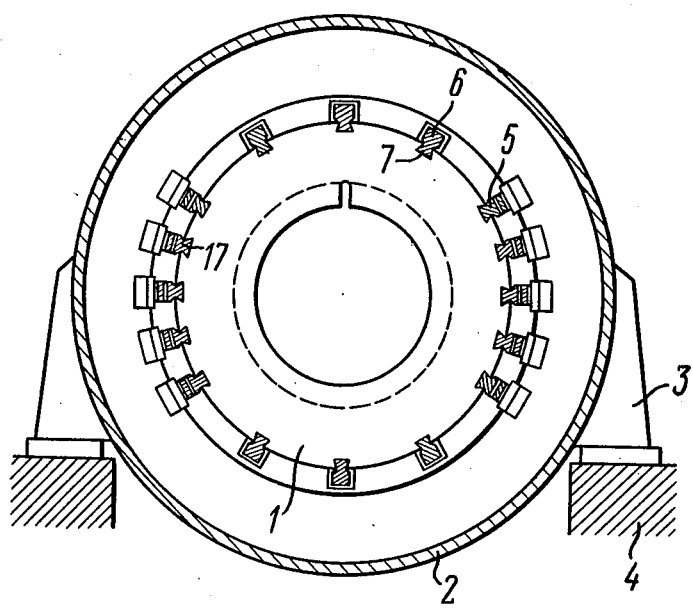
FIG. 1 is a cross-sectional view of an electric machine stator with a core resiliently supported in the frame, in accordance with the present invention.
Figures 2, 3:
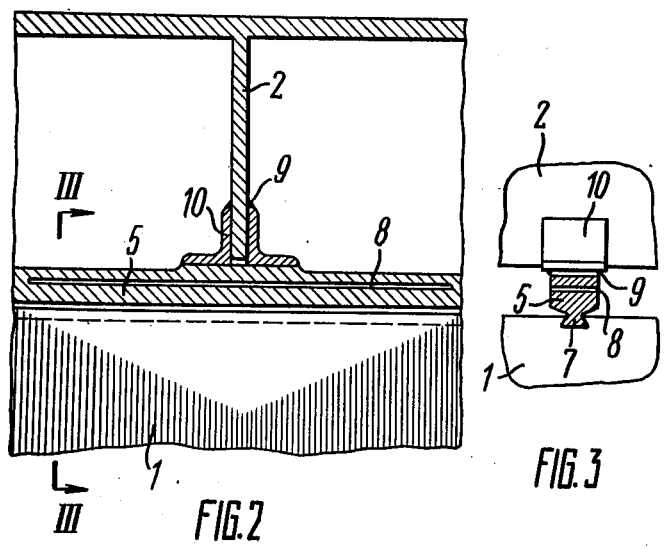
FIG. 2 is an enlarged, cross-sectional view showing a resilient support rib secured to the core and the stator frame, in accordance with the invention.
FIG. 3 is a cross-sectional view taken along the line III—III of FIG. 2.

Referring now to FIG. 1, the electric machine stator comprises laminated core 1 supported in a frame 2 mounted on a base 4 by means of supporting feet 3. The core 1 is restrained in the axial direction by support ribs 5 and 6 arranged on the outer surface of the core 1 and longitudinally secured to the core 1 over its length by dovetail key and slot connections 7. The support ribs 5 and 6 are equally spaced around the periphery of the outer surface of the core 1, both adjacent the portions of the frame 2 of maximum rigidity and adjacent the portions of the frame 2 of lower rigidity 2. The maximum rigidity portion of the frame 2, in this embodiment of the invention, is the area of the supporting feet 3 (end sections of the stator) and the minimum rigidity portion of the frame 2 is the top section of the stator. The support ribs 5, located in the area of the supporting feet 3, are made resilient by milling slots 8 (FIGS. 2,3) in the body of the rib 5, and are secured to the frame 2 by means of a welded joint 9 and corners 10. The support ribs 6 (FIG. 1) spaced away from the supporting feet 3 of the stator and disposed on the less rigid portions of the frame 2 (top and bottom sections of the core 1 in FIG. 1) are not attached to the frame 2. These ribs 6 act merely as connecting pins of the core 1 and are used for uniform compression thereof and, therefore, to facilitate the fabrication process. They are made nonresilient (without any longitudinal slots milled there in).

Figure 4:
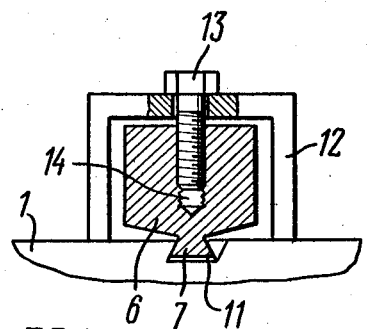
FIGS. 4, and 5 are enlarged, cross-sectional views showing attachment of the support ribs, not connected with the frame, to the stator core, in accordance with the invention.

FIG. 4 shows an embodiment wherein the support ribs 6, not attached to the frame 2, are secured to the outer surface of the core 1 to prevent them from displacement, due to vibrations, within the clearance in the slots 11 of the dovetails and, thereby, minimize any additional noise. Clamps 12 are disposed at a number of points along the ribs 6. A bolt 13 screwed into a threaded hole 14 of the rib 6 bears its head against the clamp 12, bends the rib 6 away from the core 1 and locks the dovetail 7 in position in the slot 11. To avoid loosening of the bolt 13 spring washers are inserted below its head (not shown).

Figure 5:
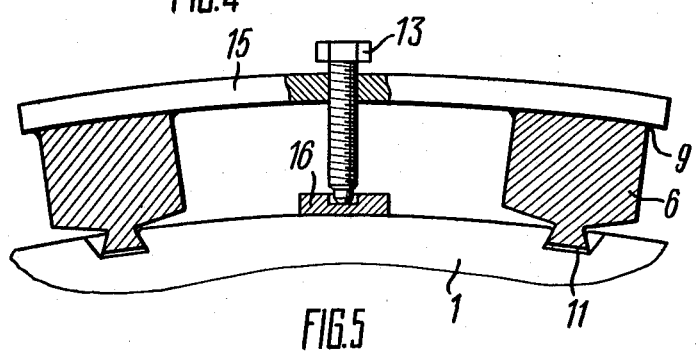

FIG. 5 shows an embodiment with twin attachment of the ribs 6 to the outer surface of the core 7. Transverse plates 15 mounted in several cross-sectional planes along the core 1 are bolted or welded at their ends to adjacent ribs 6. The bolt 13 bearing against the core 1 through a base member 16 is screwed into a threaded bore of the plate 15. This construction provides a more reliable attachment of the ribs 6 as regards the effect of tangential vibrations. To prevent the bolt 13 from loosening, spring washers are inserted under its stop end (not shown).

Other embodiments are possible with various means for securing the support ribs 6 not attached to the frame 2 of the core 1.

To ensure a reliable resilient support of the core 1, additional resilient ribs 17 are provided in the area of the supporting feet 3 of the frame 2 (FIG. 1). The additional ribs 17 are disposed intermediate of the main resilient ribs 5 and are secured to the core 1 and the frame 2 in the same way as are the ribs 5. To this end, additional slots for the dovetail 7 of the additional ribs 17 are provided on the outer surface of the core 1. The additional ribs 17 are not secured at the ends thereof to the thrust plates (not shown) of the core 1 and are not axially stressed so as to ensure uniform compression of the core 1.

Figure 6:
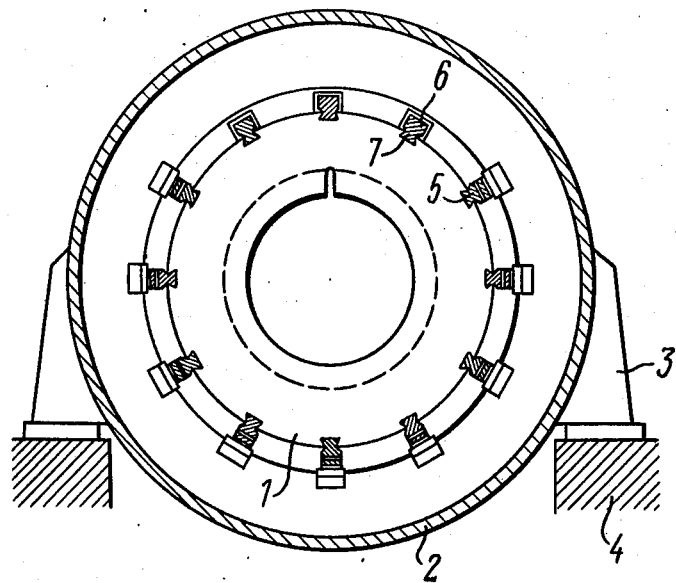
FIG. 6 is a cross-sectional view of the electric machine stator, in which the attachment of the core to the frame is made by means of resilient support ribs disposed in the area of the frame supporting feet and in the area of the base, in accordance with the invention.

FIG. 6 shows an embodiment of the stator, in which the core 1 is supported in the frame 2 by means of resilient support ribs 5 located in the area of the supporting feet 3 and of the base 4. In this case, it is only in the top section that the support ribs 6 are not linked with the frame 2. The advantage of this embodiment of the invention is that it obviates the need to provide additional ribs in the end sections.

During operation of the electric machine, the vibrations of the core 1, owing to radial and tangential resilience of the support ribs 5 (FIG. 1) forming part of the flexible support, are transmitted to the frame 2 subject to damping.

The frame 2 has the highest dynamic rigidity in the area of the supporting feet 3 of the stator, where the resilient support ribs 5 are attached, and is least responsive to vibrational excitation, in this area. The vibrations of of the frame 2 and the base 4 are appreciably reduced as compared with the case where the core 1 is secured around the periphery of the stator. In the upper and lower sections of the stator, where the core 1 is not attached to the frame 2, no vibration of the core 1 is transmitted to the frame 2. The attachment of the upper and lower ribs 6 to the back of the core 1 by means of additional interconnecting members 12 and 15 (FIGS. 4,5) prevents these ribs from self-sustained vibration with impacts against the dovetail slot 11, thereby minimizing the stator noise.

Experiments have shown that shifting all the resilient supporting members to the area of the stator feet (without affecting their total regidity and strength) leads to considerable reduction of vibration of both the frame and the base. There is a consequent reduction of the stator noise due to the transmission of high-frequency sound vibrations to the frame with a resulting increase in the reliability of the electric machine operation.

What is claimed is:

1. A stator of an electric machine mounted on a base, comprising:
a frame mounted on said base by supporting feet, portions of said frame adjacent said supporting feet being portioned of highest rigidity, and portions not adjacent to supporting feet being portions of lowest rigidity a laminated core supported in said frame and having slots arranged substantially at equally spaced intervals around the periphery of an outer surface of said core;

a plurality resilient support ribs located in said slots adjacent said portions of said frame of highest rigidity and secured to said frame in said portions of highest rigidity to axially restrain said core and to support said core in said frame; and a plurality of non-resilient support ribs located in said slots adjacent said portions of lowest rigidity to axially restrain said core and to provide for uniform compression of said core.

2. A stator of an electric machine as defined in claim 1, wherein said resilient support ribs are disposed in an area adjacent said supporting feed of said frame and said non-resilient support ribs are disposed on the remaining portion of the outer ssurface of said core.

3. A stator of an electric machine as defined in claim 1, wherein said resilient support ribs are disposed in an area adjacent said supporting feet of said frame and in an area adjacent said base and said non-resilient support ribs are disposed on the remaining portion of the outer surface of said core.

4. A stator of an electric machine as defined in claim 1, wherein said resilient support ribs of the second set of resilient support ribs include interconnecting members extending along said ribs and attached to said core to rigidly secure said ribs to the outer surface of said core.

5. A stator of an electric machine as defined in cleim 2, wherein said non-resilient support ribs include interconnecting members extending along said ribs and attached to said core to rigidly secure said ribs to the outer surface of said core.

6. A stator of an electric machine as defined in claim 3, wherein said non-resilient support ribs include interconnecting members extending along said ribs and attached to said core to rigidly secure said ribs to the outer surface of said core.

7. A stator of an electric machine mounted on a base, comprising:

a frame mounted on said base by supporting feet;

a laminated core supported in said frame and having slots arranged substantially at equally-spaced intervals around rhe periphery of an outer surface of said core;

a plurality of resilient support ribs located in said slots adjacent portions of said frame adjacent to said supporting feet and secured to said frame in said portions to axially restrain said core and to support said core in said frame; and a plurality of non-resilient support ribs located in said slots adjacent portions of said frame not adjacent to said supporting feet to axially restrain said core and to provide for uniform compression of said core, said non-resilient support ribs including interconnecting members extending along said non-resilient ribs and attached to said core to rigidly secure said non-resilient ribs to the outer surface of said core, said interconnecting members being in the form of a U-shaped clamp bearing against the surface of said core and a bolt fastening said clamp and said non-resilient support rib together.

8. A stator of an electric machine mounted on a base, comprising:

a frame mounted on said base by supporting feet;

a laminated core supported in said frame and having slots arranged substantially at equally spaced intervals around the periphery of an outer surface of said core;

a plurality of resilient support ribs located in said slots adjacent portions of said frame adjacent to said supporting feet of said frame and adjacent said base to axially restrain said core and to support said core in said frame; and a plurality of non-resilient support ribs located in said slots adjacent portions of said frame not adjacent to said supporting feet or said base to axially restrain said core and to provide for uniform compression of said core, said non-resilient support ribs including interconnecting members extending along said non-resilient ribs and attached to said core to rigidly secure said non-resilient ribs to the outer surface of said core, said interconnecting members being in the form of a U-shaped clamp bearing against the surface of said core and a bolt fastening said clamp and said non-resilient support ribs together.

* * * * *